(12) United States Patent
Wight

(10) Patent No.: US 6,628,235 B2
(45) Date of Patent: Sep. 30, 2003

(54) METHOD FOR PHASED ARRAY ANTENNA SIGNAL HANDOFF

(75) Inventor: Dennis Wight, Edmonds, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/024,301

(22) Filed: Dec. 17, 2001

(65) Prior Publication Data

US 2003/0112180 A1 Jun. 19, 2003

(51) Int. Cl.[7] .............................. H01Q 3/22; H01Q 3/24; H01Q 3/26
(52) U.S. Cl. ........................ 342/374; 342/442; 455/436; 455/277.2
(58) Field of Search ................................ 342/374, 442; 455/436, 437, 439, 277.1, 277.2

(56) References Cited

U.S. PATENT DOCUMENTS 5,280,637 A * 1/1994 Larosa et al. ............. 455/277.1
5,617,102 A * 4/1997 Prater ......................... 342/374
6,327,481 B1 12/2001 Nagashima

FOREIGN PATENT DOCUMENTS

| EP | 0 646 982 A1 | 4/1995 |
| EP | 1 032 073 A2 | 8/2000 |
| WO | WO 99/21391 | 4/1999 |

OTHER PUBLICATIONS

International Search Report, PCT/US 02/39262, mailed Mar. 26, 2003.

* cited by examiner

*Primary Examiner*—Theodore M. Blum
(74) *Attorney, Agent, or Firm*—Harness Dickey & Pierce P.L.C.

(57) ABSTRACT

A method for handing-off phased array antenna signals is provided. A phased array multiple antenna system receives and demodulates signals using one receiver. The phased array antennas are controlled electronically by an antenna controller. An antenna switch matrix in the antenna controller selects between signals from a handing-off antenna and a handed-to antenna. A phase comparator compares the two signals and produces a phase error signal proportional to the difference between the phase angles of the two signals. A negligible phase error difference is predetermined wherein antenna handoff can occur without causing loss of phase lock on the handed-to antenna signal. When the antenna controller signals a hand-off and the phase error equals the negligible phase error difference, a fast switch performs the hand-off. Power consumption is also controlled by requiring only one antenna to be powered "on" at a time.

33 Claims, 5 Drawing Sheets

METHOD FOR PHASED ARRAY ANTENNA SIGNAL HANDOFF

FIELD OF THE INVENTION

The present invention relates generally to a phased array antenna system. More specifically, the present invention relates to a method for signal handoff between individual antennas of a phased array antenna system.

BACKGROUND OF THE INVENTION

Electronic communication systems generally employ antennas to both transmit and receive signals. Historically, antennas were mechanically moved to provide coverage of a wide area for transmitting or receiving signals. Phased array antennas are now favored in communication systems for their ability to electronically point the antenna quickly in many different directions without having to mechanically reposition the antenna. Multiple phased array antennas with different orientations may be used for wider coverage than one antenna alone can provide. Signals from the phased array antennas are provided to a communications receiver. Where only a single communications receiver is employed with multiple phased array antennas, a means of electronically switching or handing-off the signal between the multiple phased array antennas and the receiver must be provided.

Phased array transmit/receive antennas operate effectively over a fairly wide range of steering angles encompassed by a solid angle of up to approximately 120°. In some applications, particularly where the antennas are mounted on a moving platform such as an aircraft, the receiving antennas are moving relative to the signal source. The signal source may be a satellite, another aircraft, or a ground based transmitting/receiving station. A crude method of switching between an active and an inactive phased array antenna would be to simply switch antennas. To minimize power requirements, typically only one antenna would be active or powered on at a given time. As the active antenna beam is steered toward its extreme angle, a second or adjacent antenna would be electronically prepositioned to receive the incoming signal. The second (or inactive) antenna, which is powered off at the time, would be prepared to track the target signal within its coverage region immediately after being powered on and the original or active antenna subsequently being powered off.

At the point of the handoff between the two antennas, a "make before break" sequence would normally take place as follows: 1) the inactive antenna is powered on, 2) a high speed switch connects the inactive antenna and disconnects the active antenna, then 3) the active antenna is powered off. This crude method results in data loss when the handed-to (second) antenna signal is not "in-phase" with the handing-off antenna signal, causing the receiver to temporarily lose phase lock on the switched antenna signal.

Prior to employment of a phased array antenna system, the antenna spacing, frequency of the carrier signal(s), and the desired beam angle (or multiples thereof) for handing-off the signals must be chosen. Given these selections, a threshold phase angle shift or difference of about 15° or less between antenna signals would normally be assumed within which phase lock could be maintained. Signals varying in phase angle less than the threshold value are within a negligible phase error region, i.e., a negligible phase angle shift region.

When switching between antennas in communication systems with multiple phased array antennas which share a common receiver a mismatch of signal phase or signal amplitude between the antennas may cause the receiver phase lock loop (PLL) to lose phase lock. Antenna handoff occurring at this mismatch period produces a phase discontinuity in the signal, thereby causing at least a temporary loss of phase lock. Information contained in the antenna signal is lost until the receiver can re-establish phase lock. To minimize the possibility of phase lock loss, the more closely the amplitude and phase are matched prior. to switching antennas, the greater the chance of maintaining receiver lock when switching takes place. A problem in existing systems is that the two antenna beams cannot maintain closely matched beam steering synchronization and delay (time of flight) compensation prior to switching to prevent phase lock loss. A method is therefore required to prevent significant phase differences and subsequent data loss of the signal when preparing for and initiating handoff.

One current approach for preventing data loss (from phase lock loss) during antenna handoff is to use multiple receivers and perform the handoff on demodulated signal data at the output of the receivers. At least two communication receivers are required for this approach, plus additional electronics to save and correlate the history of the demodulated data output from each receiver. This approach has high dollar, weight, and power costs due to the additional communication receiver(s). A method of providing antenna signal handoff is therefore required which reduces the amount and therefore cost of the equipment required to provide this signal handoff.

At the point of antenna handoff, the signal from the handing-off (active) antenna is disconnected, and the signal from the handed-to (inactive) antenna must be connected. The old and new signal will have different amplitudes and phase angles due to differences in beam path, beam angle, and antenna properties as noted above. The switch action itself will also add a small interruption or transient. If this interruption or discontinuity is small (i.e., small enough not to break phase lock loop in the receiver), the risk of data loss will be small. A switch is therefore selected from available switch designs having a speed coincident with the receiver requirements, i.e., the switch speed must not cause loss of phase lock. A receiver phase lock loop (PLL) is normally more susceptible to phase changes of the received signal than to signal perturbations from switch interruption. A method to provide signal handoff between antennas is therefore required wherein the switch action itself is performed at a high enough speed to reduce the potential for signal loss.

The communications receiver design is also an important factor in accomplishing antenna handoff with little or no loss of data. The receiver design normally accommodates the three sources of signal perturbation (amplitude change, phase change and switching transients) with minimal or no data dropout. The integrated system including the antenna and the receiver should therefore provide appropriate response to signal disturbance by not losing signal lock, by recovering from loss of signal lock with no dropping of data, or by recovering in such a manner that the resulting loss of data is corrected by the particular forward error correction scheme utilized. A method of handling phased array antenna handoff is therefore required to minimize impact on the receiver design and meet the criteria of not losing signal lock.

SUMMARY OF THE INVENTION

The above drawbacks and problems are addressed by the method of handing-off phased array antenna signals of the present invention. According to the invention, there is provided a phased array communication system which receives and demodulates communication signals using multiple phased array antennas with one receiver. Communication signals are received by the phased array receiving antennas, which are controlled electronically by an antenna controller. The antenna signals go through an antenna select switch matrix in the antenna controller which distinguishes between selected signals from an active handing-off antenna and an inactive handed-to antenna.

Within the antenna controller, the two antenna signals (the handing-off and the handed-to) are routed to a phase comparator which compares the two signals and produces a phase error signal corresponding to the phase difference between the two signals. When a hand-off of signals is desired, a fast switch is enabled, a hand-off control signal from the antenna controller must indicate that antenna hand-off shall take place which requires that the phase error signal must equate to or be less than the predetermined system negligible phase error. The fast switch then performs the handoff switch action. Because the handoff occurs when there is negligible phase difference between the two antennas, phase lock on the switched signal is retained, thereby resulting in no loss or minimal loss of data from the signal handoff.

In one preferred version of the invention, a method for handing-off signals between pairs of phased array antennas is provided, comprising the steps of providing at least two phased array antennas, each designated as one of a handing-off antenna and a handed-to antenna; connecting the phased array antennas to a receiver; communicating a handing-off antenna received signal to the receiver; comparing the handing-off antenna received signal to a handed-to antenna received signal to identify a phase angle shift between the compared signals; predetermining a negligible phase angle shift; handing off the handed-to antenna signal to the receiver when the phase angle shift equals the negligible phase angle shift.

In another version of the present invention, a method for handing-off signals between pairs of phased array antennas while retaining phase lock is provided, comprising the steps of providing at least two phased array antennas, each designated as one of a handing-off antenna and a handed-to antenna; connecting the phased array antennas to a receiver; communicating a handing-off antenna received signal having a first phase angle to said receiver; receiving a handed-to antenna received signal having a second phase angle; comparing both antenna received signals in a phase comparator; producing a phase error signal proportional to a difference between said first and second phase angles; comparing the phase error signal in a control logic circuit to a predetermined negligible phase angle; and handing-off the handed-to received signal to said receiver when said phase error equals said negligible phase angle.

In yet another version of the invention a phased array antenna system is provided, comprising at least two phased array antennas, each designated as one of a handing-off antenna, and a handed-to antenna; a received signal of the handing-off antenna having a first phase angle; a received signal of the handed-to antenna having a second phase angle; a phase comparator to compare the first to the second phase angles; a phase error signal produced by the phase comparator, said signal proportional to the difference between the compared phase angles; an antenna controller; a receiver initially receiving the handing-off antenna received signal; a switch connectably joining both antennas to the receiver; and said switch electrically communicating between each antenna through an antenna select switch matrix, said matrix provided within said controller; wherein the antenna controller compares the phase error signal to a predetermined negligible phase error and when the phase error signal equals the negligible phase error signal the received signal of the handed-to antenna is switched to the receiver.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Figure 1:
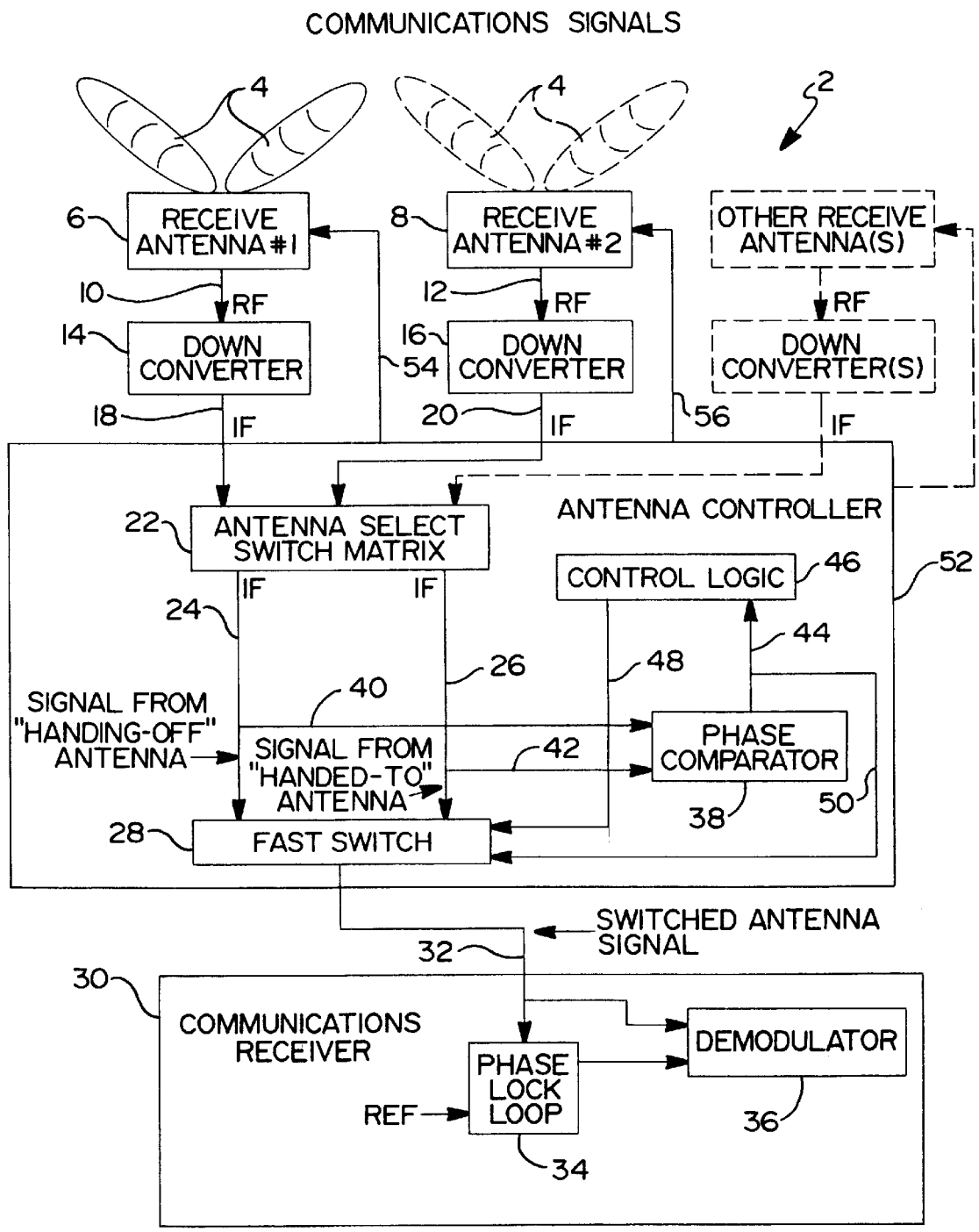
FIG. 1 is a block diagram illustrating the phase comparator and error signal therefrom used together with an antenna controller per the present invention to hand-off antenna signals.

Referring to FIG. 1, a block diagram of an antenna system 2 employing the phased array antenna handoff system of the present invention is disclosed. Incoming electromagnetic (EM) signals forming a signal source 4 are shown being received by multiple receiving antennas. A handing-off (active) antenna 6 is shown as well as a handed-to (inactive) antenna 8. The handing-off and handed-to antenna received signals are transferred via first and second radio-frequency (RF) interfaces 10 and 12 respectively, to first and second down-converters 14 and 16 and subsequently through intermediate frequency (IF) interfaces 18 and 20 to an antenna select switch matrix 22. From the antenna select switch matrix 22 the signals are passed via first and second switch IF interfaces 24 and 26 to a fast switch 28 which is responsible for switching between incoming antenna signals. From fast switch 28, the signal of the active antenna is passed through to communication receiver 30 via switched antenna signal line 32 to phase lock loop 34, and demodulator 36.

Prior to initiating a hand-off of incoming signals between the handing-off antenna 6 and the handed-to antenna 8, fast switch 28 is enabled, and both of the incoming signals from the antennas are passed to phase comparator 38 via phase comparator feedline 40, and phase comparator feedline 42, respectively. Phase comparator 38 compares the phase angles of both incoming signals, and a phase error signal is sent by phase comparator output line 44 to control logic circuit 46. If a negligible phase angle shift is exhibited between the two signals, the signal from phase comparator 38 to shift from the handing-off (active) antenna 6 to the handed-to (inactive) antenna 8 is sent directly to enabled fast switch 28 via phase comparator signal line 50.

Negligible phase angle shift is a predetermined value which is a function of system parameters, including signal frequency, wavelength and desired beam shift angle. For the present invention, a threshold phase angle shift between received signals of about 15° or less provides a window within which phase lock should be maintained. With appropriate equipment selection, however, switching at a phase angle shift up to about 30° may be achievable without losing phase lock in the receiver. When the phase difference between the handing-off and handed-to antenna signals approach but do not yet reach the predetermined negligible phase angle shift threshold i.e., about 15°, the signal from phase comparator 38 is sent via comparator output line 44 to control logic circuit 46. Control logic circuit 46 then provides the signal via control logic output line 48 to fast switch 28 to switch between the handing-off antenna 6 and the handed-to antenna 8 signals. The "switched" antenna signal is thereafter communicated to communication receiver 30 via switched antenna signal line 32.

FIG. 1 shows that a multitude of receiving antennas can also be employed with the invention. Antenna select switch matrix 22, fast switch 28, phase comparator 38, and control logic circuit 46 are all disposed in an antenna controller 52. Antenna controller 52 provides control signal lines 54 and 56 to electronically control handing-off antenna 6 and handed-to antenna 8 respectively.

Figure 2:
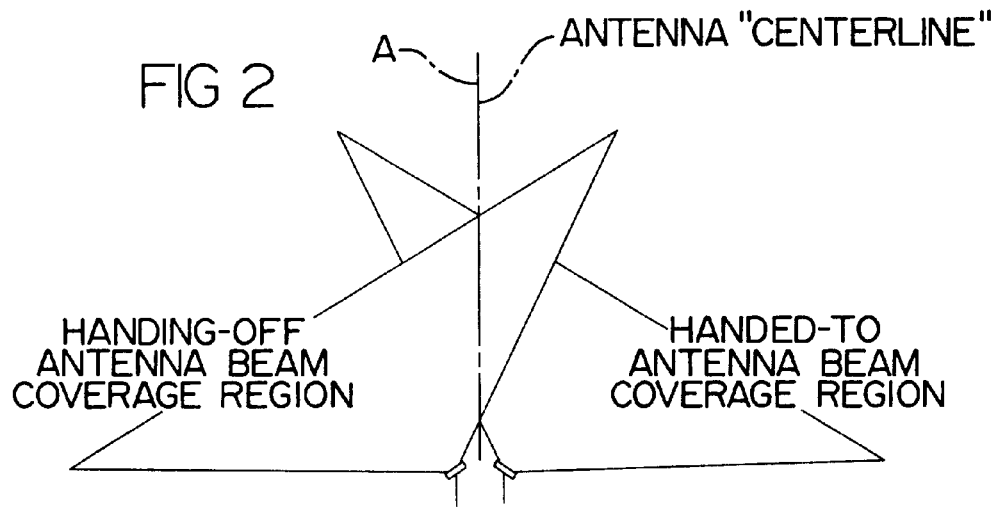
FIG. 2 is a plan view showing overlapping left and right typical phased array antenna coverage regions having an imaginary antenna centerline.

Referring to FIG. 2, antenna beam coverage regions of two overlapping receiving antennas are shown. The coverage region for each antenna is typically about 120°. An imaginary center line "A" bisects the beam coverage overlap regions of the two antennas to a line connecting the phase center of each antenna. A far field electromagnetic (EM) signal, such as from a satellite, received from the direction of center line A will have an equal path length to each of the antenna phase centers. In this situation, the two antenna outputs will be in phase. If the antenna outputs are switched at this point there will be no phase discontinuity in the switched output signal going to the receiver, and the receiver demodulator phase lock loop (PLL) will not lose phase lock.

Figure 3:
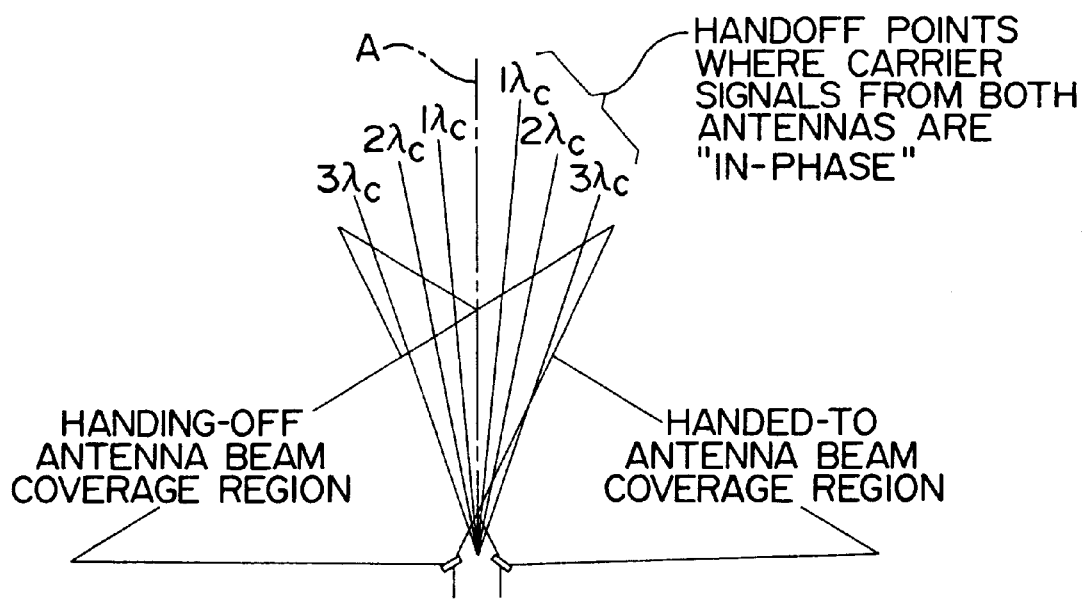
FIG. 3 is a plan view modifying the coverage regions of FIG. 2 to identify the handoff points where carrier signals from both antennas are in-phase.

Referring to FIG. 3, as the direction of the arriving EM signal moves off axis from center line A, the signal path lengths from the EM signal source to the phase center of each antenna will be increasingly unequal. However, whenever the path difference equals a multiple of the carrier wavelength $\lambda_c$, the carrier component of the two signals will be in-phase. This provides an opportunity to switch antenna signals at specific off-axis angles corresponding with each $n\lambda_c$ path length difference as shown.

Figure 4:
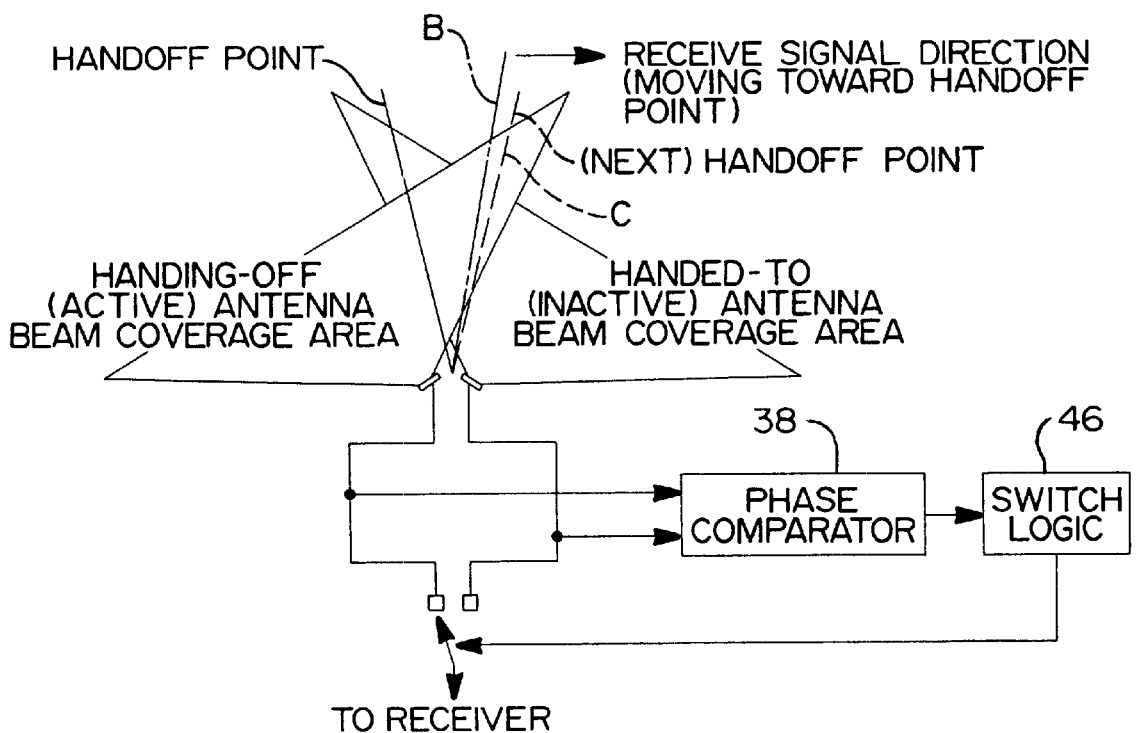
FIG. 4 provides a block diagram of the system components together with further modifications to the antenna coverage regions shown in modifying the plan view of FIGS. 2 and 3 to further identify an active left antenna with handoff points to the right antenna.
Figure 5:
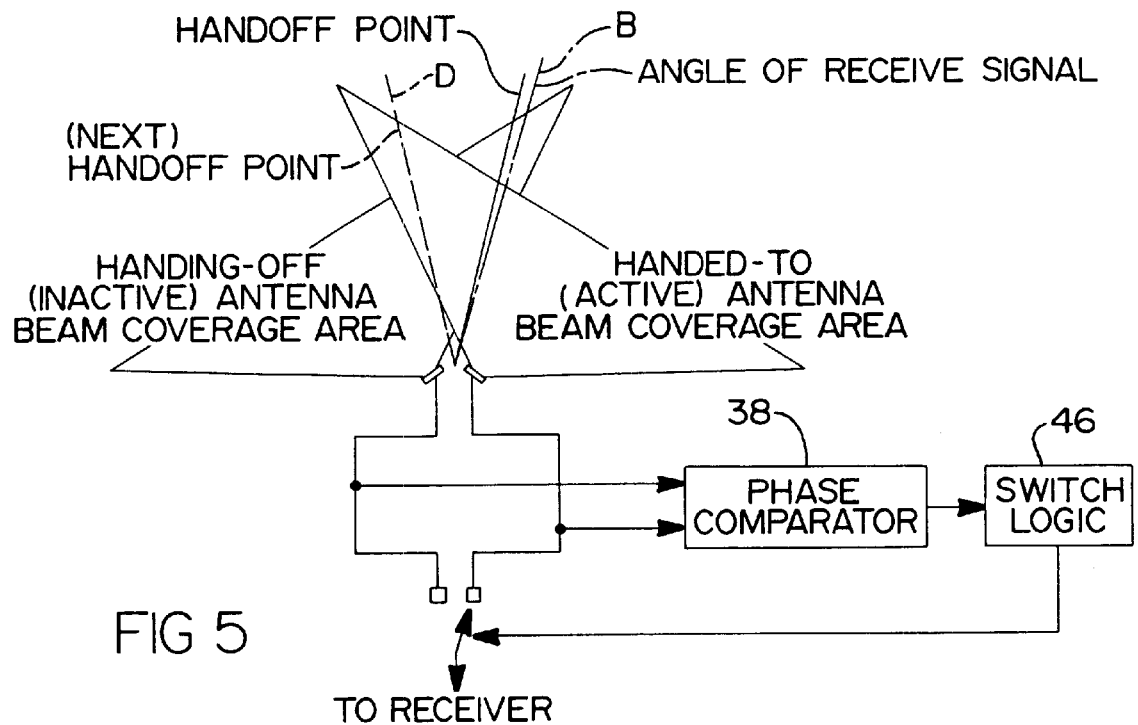
FIG. 5 provides the block diagram of FIG. 4 and also identifying an active right antenna following beam switching.

Referring now to FIGS. 4 and 5, by handing-off at angles to the right and left of center line A (FIG. 3), hysteresis can be incorporated in the hand-off process to provide stability. As an exemplary operation, in a left-to-right antenna handoff scenario, FIG. 4 depicts the situation just before handoff, and FIG. 5 shows the situation just after handoff. As the direction of the received signal B moves from left to right in FIG. 4, it approaches the predetermined handoff angle C which corresponds with one of the $n\lambda_c$ handoff angles shown to the right of centerline in FIG. 3. When the direction of signal B passes through handoff angle C as shown in FIG. 5, the handoff occurs, and the new angle for the next handoff is now at D to the left of centerline, providing hysteresis. At each occurrence of a handoff, the next handoff point automatically flips to the opposite side of centerline A. For a given system, the hysteresis angle corresponding with $2(n\lambda_c)$ would be a predetermined parameter in an antenna controller handoff algorithm.

Although hand-off at angles representing multiples of $\lambda_c$, for instance $n\lambda_c$, where "n" represents the multiplier, produces no phase discontinuity in the carrier component of the switched signal going to the receiver, the increasing hysteresis angle produces an increasing phase shift of the modulation component of the signal. The demodulated base band signal must go through a clock recovery process involving another PLL. Switching the antenna signal, when the antenna path lengths are unequal by $n\lambda_c$, will introduce an instantaneous phase shift in the base band signal which could throw the clock recovery PLL out of phase lock. This phase shift will be proportional to the ratio $n\lambda_c/\lambda_b$, where $\lambda_b$ is the base band symbol. As long as $n\lambda_c$ is much less than $\lambda_b$, i.e., under approximately 3%, the clock recovery PLL should not lose phase lock.

It is important to introduce only the minimum hysteresis necessary, i.e., keep the "n" in $n\lambda_c$ as small as possible, such that for a given antenna spatial separation, carrier frequency, and modulation bandwidth, the resulting base band phase shift will be negligible, and prevent the base band clock recovery PLL from losing phase lock when the antenna signals are switched.

Figure 6:
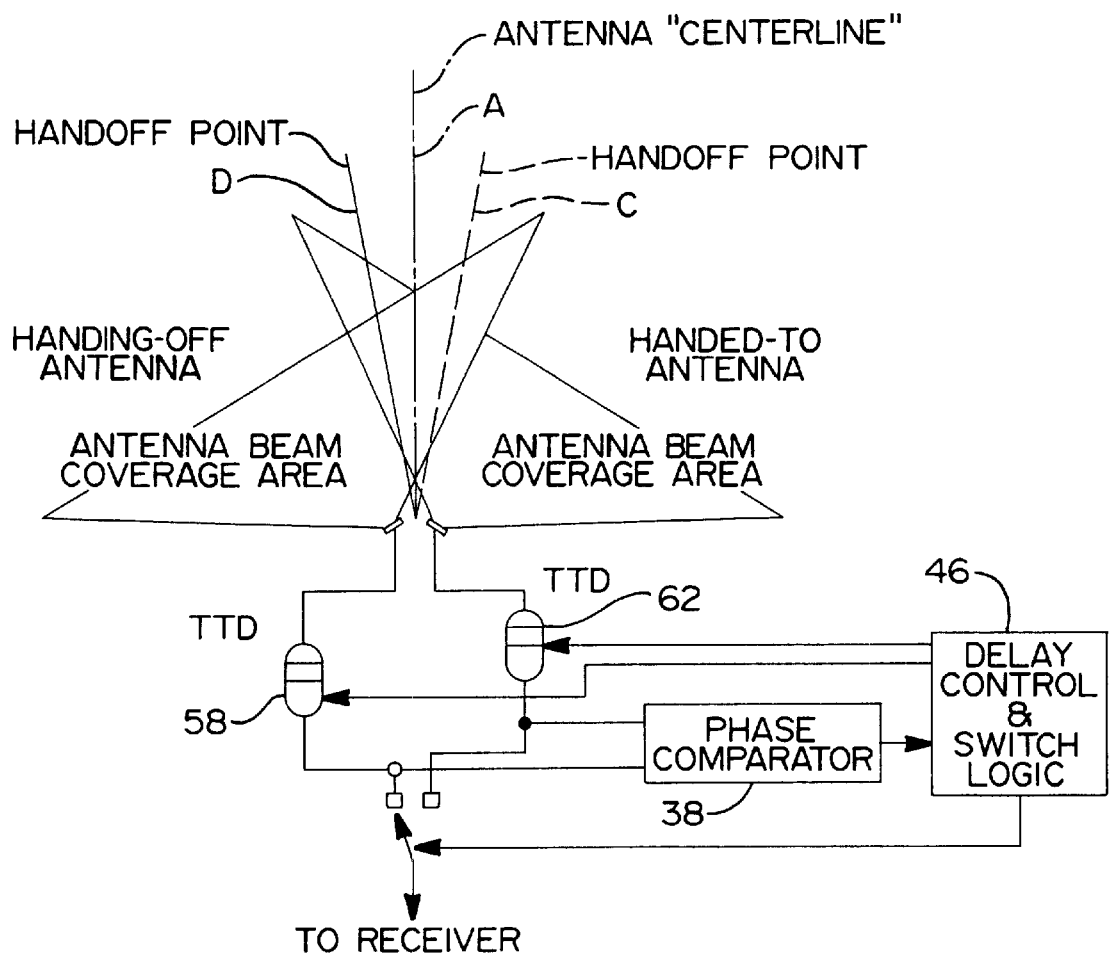
FIG. 6 is a block diagram showing antenna coverage regions for another preferred embodiment of the present invention having True Time Delay (TTD) lines in the switching path between phased array antennas.
Figure 7:
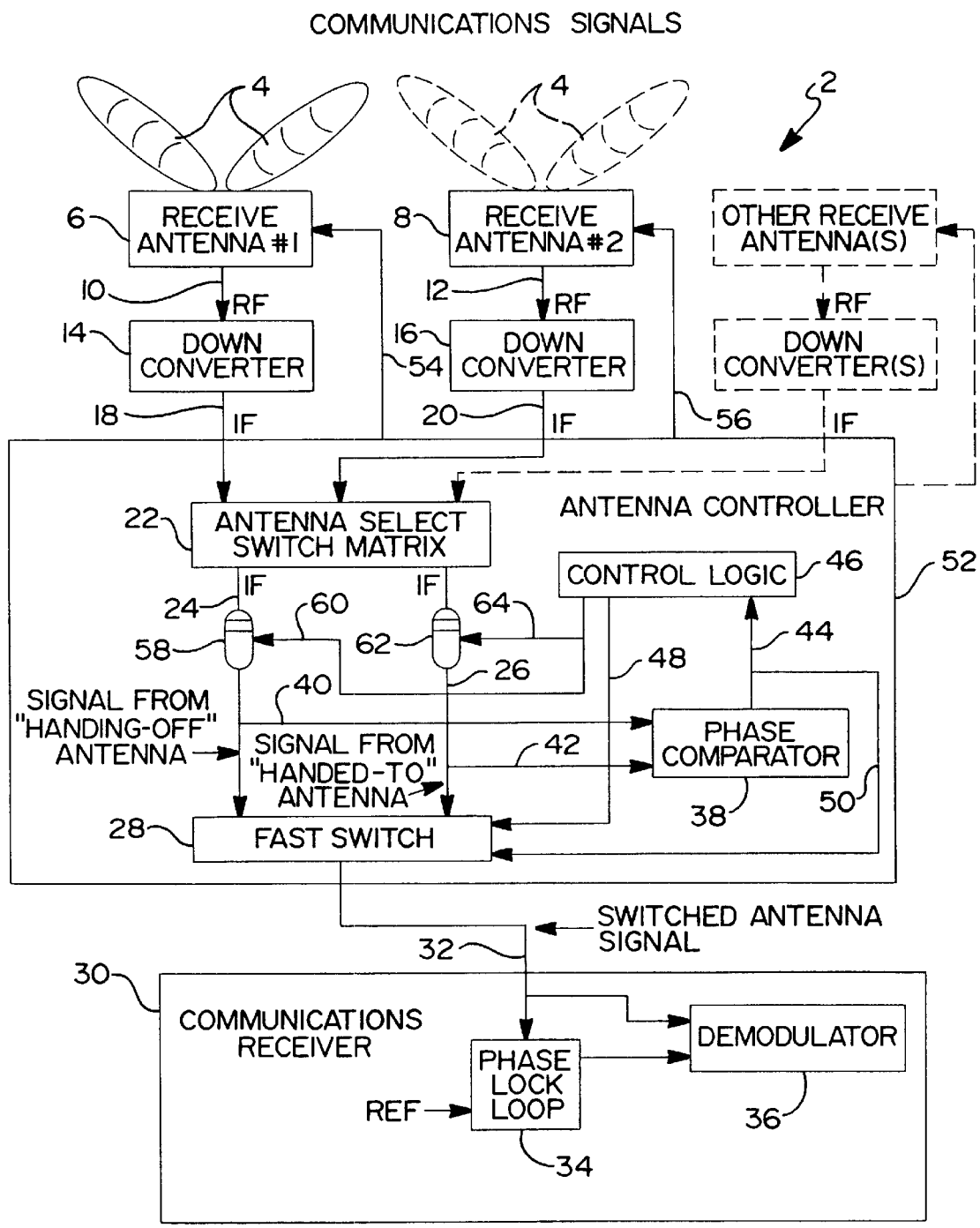
FIG. 7 is a block diagram similar to FIG. 1 showing the addition of True Time Delay (TTD) lines into an antenna controller of the present invention.

The preceding method is particularly effective at controlling antenna handoff at narrow band modes. For wide band modes, another version of the invention is herein provided. Referring to FIGS. 6 and 7, true time delay lines are introduced into the intermediate frequency (IF) signal paths. In this version, hand-off performance is determined by the performance of the true time delay (TTD) lines. The separation of the antennas and the amount of desired hysteresis determines the TTD range, while the carrier frequency determines the TTD delay steps. FIG. 7 is primarily based on the equipment and methodology of FIG. 1, therefore only the differences from FIG. 1 will be further discussed.

In operation, as the antenna signal direction approaches the right hand-off point C, a TTD module 58 for the handing-off antenna via delay control line 60 would be programmed for zero delay. A TTD module 62 for the handed-to antenna via delay control line 64 would be programmed for a delay equal to the difference in signal path length to the two antennas at the required hysteresis angle. At the hand-off point C, phase comparator 38 signals the handoff switch action. As shown in FIG. 6, this operation also works in the opposite direction, wherein TTD module 62 would be programmed as the handing-off antenna, TTD module 58 would be programmed as the handed-to antenna, and hand-off would be at hand-off point D.

In this version, the hand-off occurs with no phase shift because the signal delays in both antenna signal paths are equalized. Immediately following the handoff, however, there is a delay in the handed-to antenna signal path which must be removed in preparation for the next hand-off in the opposite direction. Both TTDs are controlled by control logic circuit 46 which must gradually but expeditiously step the delay back down to zero before the next handoff occurs. An exemplary step-down would be performed in tens of milliseconds per step. The TTD delay step sizes for an assumed IF frequency should be less than approximately $\lambda_{IF}/30$ to avoid introducing a phase shift which would throw the receiver demodulator PLL out of phase lock.

The description of the invention is merely exemplary in nature and, thus, variations that do not depart from the gist of the invention are intended to be within the scope of the invention. Such variations are not to be regarded as a departure from the spirit and scope of the invention.

Although a threshold phase angle error of about 15° or less would normally be assumed within which phase lock should be maintained, this value may be increased given further advances in the art, without departing from the spirit and scope of the invention.

Practical microwave switches are available with switching times down to about one nanosecond (nsec). Switch operation may result in loss of phase lock and subsequent data loss due to switch speed in some applications. The switch employed is a function in part of available switch speed and the available receiver. Employment of a switch capable of operating below about one nsec does not depart from the spirit and scope of the invention.

Loss of data during hand-off may also be avoided by choice of data transmission protocol in concert with this invention. For example, network protocols such as Transmission Control Protocol (TCP) are tolerant of data dropouts due to the built-in requirement for data delivery verification (or "retransmit until successful"). Also, data transmission formats which have predetermined or detectable "gaps" between data blocks or messages provide another opportunity to avoid data loss during hand-off by synchronizing antenna hand-off with the "gaps" or boundaries between data bursts. An example of this type of format is broadcast television which has a sizable vertical blanking interval. The use of data transmission protocols in conjunction with the method of this invention does not depart from the spirit and scope of the invention.

The invention provides the advantages of a phased array antenna system employing multiple antennas but only a single receiver, a method to switch between multiple phased array antennas while retaining phase lock on the signal in the receiver phase lock loop, a method to employ true time delay lines in a multiple phased array antenna system having one receiver to switch between on active antenna and an inactive antenna, while maintaining receiver phase lock, and power consumption control. by requiring only one antenna to be powered "on" at a time.

What is claimed is:

1. A method for handing-off signals between pairs of phased array antennas comprising the steps of:
   providing at least two phased array antennas, each designated as one of a handing-off antenna and a handed-to antenna;
   connecting the phased array antennas to a receiver;
   communicating a handing-off antenna received signal to the receiver;
   comparing the handing-off antenna received signal to a handed-to antenna received signal to identify a phase angle shift between the compared signals;
   predetermining a negligible phase angle shift;
   handing off the handed-to antenna signal to the receiver when the phase angle shift equals the negligible phase angle shift.

2. The method of claim 1, further comprising the steps of:
   electrically communicating both the handing-off antenna received signal and the handed-to antenna received signal to a phase comparator; and
   comparing the handing-off antenna received signal to the handed-to antenna received signal in the phase comparator.

3. The method of claim 2, further comprising the step of:
   determining when the phase angle shift equals the negligible phase angle shift in a control logic circuit.

4. The method of claim 3, further comprising the step of:
   handing-off the handed-to antenna signal to the receiver through a fast switch.

5. The method of claim 4, further comprising the step of:
   enabling the fast switch prior to handing-off the handed-to antenna signal.

6. The method of claim 4, further comprising the steps of:
   disposing the fast switch, the phase comparator and the control logic circuit in an antenna controller;
   producing a handoff control signal by the antenna controller;
   triggering the fast switch to hand off the handed-to signal when the handoff control signal indicating an antenna handoff corresponds with the negligible phase angle shift.

7. The method of claim 6, further comprising the steps of:
   disposing an antenna switch matrix in the antenna controller in electrical communication between both said antennas and said fast switch; and
   selecting between said received signals of each of the handing-off antenna and the handed-to antenna using the antenna switch matrix.

8. The method of claim 1, further comprising the steps of:
   tracking a target signal using the handing-off antenna;
   powering on the handed-to antenna prior to comparing the handing-off antenna received signal to the handed-to antenna received signal to enable both said antennas to track said target signal; and
   powering off the handing-off antenna after handing off the handed-to antenna signal to the receiver.

9. The method of claim 1, further comprising the steps of:
   routing the handing-off antenna received signal through a phase-lock-loop (PLL) in said receiver; and
   identifying a phase lock exists in the PLL for the handed-to antenna signal following hand off.

10. A method for handing-off signals between pairs of phased array antennas while retaining phase lock, comprising the steps of:
    providing at least two phased array antennas, each designated as one of a handing-off antenna and a handed-to antenna;
    connecting the phased array antennas to a receiver;
    communicating a handing-off antenna received signal having a first phase angle to said receiver;
    receiving a handed-to antenna received signal having a second phase angle;
    comparing both antenna received signals in a phase comparator;
    producing a phase error signal proportional to a difference between said first and second phase angles;

comparing the phase error signal in a control logic circuit to a predetermined negligible phase angle; and handing-off the handed-to received signal to said receiver when said phase error equals said negligible phase angle.

11. The method of claim 10, further comprising the step of:

operating an antenna select switch matrix within an antenna controller to select between signals from each of the handing-off antenna and the handed-to antenna.

12. The method of claim 10, further comprising the steps of:

routing the handing-off antenna received signal through a phase-lock-loop in the controller; and maintaining a phase lock on the handing-off antenna received signal in the phase-lock-loop.

13. The method of claim 10, further comprising the steps of:

routing the handing-off antenna received signal and the handed-to antenna received signal each through an IF signal path; and introducing a true time delay (TTD) line into an intermediate frequency (IF) signal path of each antenna.

14. The method of claim 13, further comprising the steps of:

determining a TTD range from each of a difference in antenna separation and a desired amount of hysteresis; and developing a TTD delay step based on a carrier frequency.

15. The method of claim 14 further comprising the steps of:

programming a first TTD controller for the handing-off antenna for a zero delay;

programming a second TTD controller for the handed-to antenna for a delay equal to the difference in each signal path length to each of the handing-off and handed-to antennas and the desired amount of hysteresis; and handing-off the handed-to received signal to the signal receiver when a hand-off angle at the desired amount of hysteresis corresponds to an equalized signal delay between the first TTD controller delay and the second TTD controller delay.

16. The method of claim 11, further comprising the steps of:

removing a residual delay in the handed-to antenna signal path prior to a successive hand-off in an opposite direction in increments equal to the TTD delay step.

17. A phased array antenna system comprising:

at least two phased array antennas, each designated as one of a handing-off antenna, and a handed-to antenna;

a received signal of the handing-off antenna having a first phase angle;

a received signal of the handed-to antenna having a second phase angle;

a phase comparator to compare the first to the second phase angles;

a phase error signal produced by the phase comparator, said signal proportional to the difference between the compared phase angles;

an antenna controller;

a receiver initially receiving the handing-off antenna received signal;

a switch connectably joining both antennas to the receiver; and said switch electrically communicating between each antenna through an antenna select switch matrix, said matrix provided within said controller;

wherein the antenna controller compares the phase error signal to a predetermined negligible phase error and when the phase error signal equals the negligible phase error signal the received signal of the handed-to antenna is switched to the receiver.

18. A method for handing-off signals between phased array antennas comprising the steps of:

providing a pair of phased array antennas. each designated as one of a handing-off antenna and a handed-to antenna;

comparing a first received signal of the handed-off antenna to a second received signal of the handed-to antenna to identify a phase angle shift between the compared signals;

predetermining a phase angle shift point; and handing off one of the first received signal and the second received signal to a receiver when the phase angle shift equals the phase angle shift point.

19. The method of claim 18, comprising:

defining an antenna centerline between a coverage region of each of the handing-off antenna and the handed-to antenna; and determining each of a plurality of handoff angles measurable from the antenna centerline at which the first received signal and the second received signal are in-phase with each other.

20. The method of claim 19, comprising sequencing handoff at each of the plurality of handoff angles when a path length difference between the first received signal and the second received signal equals a multiple of a carrier wavelength of both the first received signal and the second received signal.

21. The method of claim 19, comprising sequentially alternating the handoff angles on opposed sides of the antenna centerline to introduce hysteresis at the handing off step.

22. The method of claim 18, comprising automatically switching between the first received signal and second received signal in the receiver when the phase angle shift equals the phase angle shift point.

23. The method of claim 18, comprising assigning one of a plurality of data transmission protocols to the first received signal and the second received signal.

24. A phased array antenna system for switching between at least two phased array antennas, each designated as one of a handing-off antenna, and a handed-to antenna, said system comprising:

a received signal of the handing-off antenna having a first phase angle;

a received signal of the handed-to antenna having a second phase angle;

a phase comparator to compare the first to the second phase angles;

a phase signal produced by the phase comparator, said phase signal proportional to the difference between the compared phase angles;

a switch connectably joining both antennas; and a control logic circuit in communication phase angles;

wherein the phase error signal is compared in the control logic circuit to a predetermined phase angle and when the phase error signal equals the predetermined phase angle the received signal of the handed-to antenna is switched to a receiver.

25. The system of claim 24, comprising:

said switch being disposed in electrical communication between each antenna through an antenna select switch matrix; and said matrix having an individual interface to each said phased array antenna.

26. The system of claim 24, wherein said switch comprises a microwave switch having a switching speed approximately one nanosecond and greater.

27. The system of claim 24, comprising a down converter disposed between each said phased array antenna and said switch.

28. The system of claim 24, comprising a demodulator disposed in electrical communication with said phase comparator.

29. A phased array antenna system for switching between a received signal of a handing-off antenna having a first phase angle and a received signal of a handed-to antenna having a second phase angle, said system comprising:

a phase comparator to compare the first to the second phase angles;

a phase error signal produced by the phase comparator, said phase error signal proportional to the difference between the compared phase angles;

a switch connectably joining said handing-off antenna and said handed-to antenna; and a control logic circuit in communication with said switch;

a receiver section in communication with said switch, said receiver section having at least a phase lock loop;

wherein the phase error signal is compared in the control logic circuit to a predetermined phase angle and when the phase error signal equals the predetermined phase angle the received signal of the handed-to antenna is switched to the phased lock loop of the receiver section.

30. The antenna system of claim 29, comprising an antenna controller electrically coupling at least said switch, said phase comparator and said control logic circuit to each of said handing-off antenna and said handed-to antenna.

31. The antenna system of claim 30, comprising a control signal line disposed between said antenna controller and each of said handing-off antenna and said handed-to antenna.

32. The antenna system of claim 29, comprising a demodulator disposed in electrical communication with both said switch and said phase lock loop.

33. The antenna system of claim 29, comprising a switched antenna signal line disposed between said switch and said phase lock loop.

* * * * *

UNITED STATES PATENT AND TRADEMARK OFFICE
CERTIFICATE OF CORRECTION

PATENT NO. : 6,628,235 B2
DATED : September 30, 2003
INVENTOR(S) : Dennis Wight

It is certified that error appears in the above-identified patent and that said Letters Patent is hereby corrected as shown below:

<u>Column 10,</u>
Line 62, "phase angles" should be -- with the switch --

Signed and Sealed this

Twenty-seventh Day of January, 2004

JON W. DUDAS
*Acting Director of the United States Patent and Trademark Office*